United States Patent
Dave et al.

(10) Patent No.: US 10,282,647 B2
(45) Date of Patent: May 7, 2019

(54) SUBSTRATE PRE-SCANNING FOR HIGH THROUGHPUT MICROSCOPY

(71) Applicant: Massachusetts Institute of Technology, Cambridge, MA (US)

(72) Inventors: Shivang R. Dave, Boston, MA (US); Germán González Serráno, Mutxamel (ES)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/146,820

(22) Filed: May 4, 2016

(65) Prior Publication Data

US 2016/0328635 A1    Nov. 10, 2016

Related U.S. Application Data

(60) Provisional application No. 62/157,457, filed on May 5, 2015.

(51) Int. Cl.
*B01L 3/00* (2006.01)
*G06K 9/00* (2006.01)
(Continued)

(52) U.S. Cl.
CPC .............. *G06K 19/022* (2013.01); *B01L 3/54* (2013.01); *G01B 11/0608* (2013.01);
(Continued)

(58) Field of Classification Search
None
See application file for complete search history.

(56) References Cited

U.S. PATENT DOCUMENTS

| 4,513,438 A | 4/1985 | Graham et al. |
| 5,473,706 A | 12/1995 | Bacus et al. |

(Continued)

FOREIGN PATENT DOCUMENTS

| CA | 2 229 175 A1 | 8/1999 |
| EP | 2485050 | 8/2012 |

(Continued)

OTHER PUBLICATIONS

Sheppard, et al., "The Extended-focus, Auto-focus and Surface-profiling Techniques of Confocal Microscopy", Journal of Modern Optics, 1988, vol. 35, No. 1, pp. 145-154.

(Continued)

*Primary Examiner* — Kristy A Haupt
(74) *Attorney, Agent, or Firm* — Hamilton, Brook, Smith & Reynolds, P.C.

(57) ABSTRACT

Non-uniformities in substrate thickness and surface topography contribute significantly to the need for auto-focusing on a sample deposited thereon. These auto-focusing needs can be reduced or eliminated by measuring and storing substrate surface topography for later retrieval by an imaging system that can use the topographic information to help set appropriate focal parameters. These steps can be done in advance of an imaging experiment to reduce focus-related delays during the experiment. Topographic information can be stored, for example, in a database, associated with a representation of a unique substrate identifier; entry of the representation retrieves the topographic information. As another example, topographic information can be stored in an encoding device associated with the substrate.

16 Claims, 4 Drawing Sheets

(51) Int. Cl.
| | |
|---|---|
| G06K 9/20 | (2006.01) |
| G01B 11/06 | (2006.01) |
| G02B 21/24 | (2006.01) |
| G06K 19/02 | (2006.01) |
| G06K 19/06 | (2006.01) |
| G02B 21/34 | (2006.01) |
| G02B 21/36 | (2006.01) |

(52) U.S. Cl.
CPC ........... *G02B 21/241* (2013.01); *G02B 21/34* (2013.01); *G02B 21/365* (2013.01); *G06K 9/00127* (2013.01); *G06K 9/20* (2013.01); *G06K 19/06037* (2013.01); *G06K 19/06159* (2013.01); *B01L 2200/143* (2013.01); *B01L 2300/021* (2013.01); *B01L 2300/022* (2013.01); *B01L 2300/0822* (2013.01)

(56) References Cited

U.S. PATENT DOCUMENTS

| | | | |
|---|---|---|---|
| 5,671,288 | A | 9/1997 | Wilhelm et al. |
| 5,786,219 | A | 7/1998 | Zhang et al. |
| 6,674,058 | B1 | 1/2004 | Miller |
| 6,816,606 | B2 | 11/2004 | Wetzel et al. |
| 7,369,304 | B2 | 5/2008 | Maenle et al. |
| 7,776,613 | B2 | 8/2010 | Zhang et al. |
| 7,783,098 | B2 | 8/2010 | Douglass et al. |
| 7,876,948 | B2 | 1/2011 | Wetzel et al. |
| 7,893,988 | B2 | 2/2011 | Olson et al. |
| 2003/0148393 | A1 | 8/2003 | Woodbury et al. |
| 2004/0150217 | A1 | 8/2004 | Heffelfinger et al. |
| 2004/0184646 | A1 | 9/2004 | Oosawa |
| 2007/0273943 | A1* | 11/2007 | Hendriks ............ G02B 3/14 359/32 |
| 2010/0040266 | A1* | 2/2010 | Perz ............ G06T 7/11 382/128 |
| 2010/0178712 | A1 | 7/2010 | Zhang |
| 2010/0262374 | A1 | 10/2010 | Hwang et al. |
| 2012/0127297 | A1* | 5/2012 | Baxi ............ G06T 7/0002 348/79 |
| 2014/0049634 | A1 | 2/2014 | Tafas et al. |
| 2014/0050386 | A1 | 2/2014 | Humayun et al. |
| 2015/0006105 | A1 | 1/2015 | Zhou et al. |
| 2015/0286887 | A1 | 10/2015 | Dave et al. |
| 2016/0160169 | A1 | 6/2016 | Paczkowski et al. |
| 2018/0210197 | A1 | 7/2018 | Dave et al. |

FOREIGN PATENT DOCUMENTS

| | | |
|---|---|---|
| WO | WO 91/06911 A1 | 5/1991 |
| WO | WO 2010/067256 A1 | 6/2010 |
| WO | 2012054783 | 4/2012 |
| WO | 2012168184 | 12/2012 |
| WO | WO 2013/034430 A1 | 3/2013 |
| WO | 2013170048 | 11/2013 |
| WO | 2015157246 | 10/2015 |
| WO | WO 2016/179286 A1 | 11/2016 |

OTHER PUBLICATIONS

Wetzel, A.W., et al., "Design of a High-Speed Slide Imaging System for Pathology," IEEE, pp. 305-308 (2002).
Notification of Transmittal of the International Search Report and the Written Opinion of the International Searching Authority, or the Declaration, "Substrate Pre-Scanning for High Throughput Microscopy," PCT/US2016/030786, dated Sep. 30, 2016.
International Preliminary Report on Patentability, "Substrate Pre-Scanning for High Throughput Microscopy," PCT/US2016/030786, dated Nov. 17, 2017.
Brandt, S., et al., "Multiphase Method for Automatic Alignment of Transmission Electron Microscope Images Using Markers", J. Structural Biol., 133:10-22 (2001).
Erdelyi, Miklos, et al., "Single Molecule Pointillism Challenges in Localization Based Super-Resolution Microscopy", Imaging & Microscopy, 5 pages (2012).
Fronczek, D.N., et al., "High accuracy FIONA-AFM hybrid imaging", Ultramicroscopy, 111(5):340-355 (2011).
Gupta, P.B. et al., "Identification of Selective Inhibitors of Cancer Stem Cells by High-Throughput Screening", Cell, 138:645-659 (2009).
Invitation to Pay Additional Fees and, Where Applicable, Protest Fee and Partial International Search Report, PCT/US2015/024664, "Use Of Microparticle Additives To Simultaneously Enable Artifact-Free Image Registration, Auto-Focusing, And Chromatic Aberration Correction In Microscopy," (6 pages) dated Jul. 14, 2015.
Notification Concerning Transmittal of International Preliminary Report on Patentability, "Use Of Microparticle Additives To Simultaneously Enable Artifact-Free Image Registration, Auto-Focusing, And Chromatic Aberration Correction In Microscopy," PCT/US2015/024664, (10 pages) dated Oct. 20, 2016.
Notification of Transmittal of the International Search Report and the Written Opinion of the International Searching Authority, or the Declaration, "Use Of Microparticle Additives To Simultaneously Enable Artifact-Free Image Registration, Auto-Focusing, And Chromatic Aberration Correction In Microscopy," PCT/US2015/024664, (18 pages) dated Oct. 12, 2015.
Jones, S.A., et al., "Fast, Three-dimensional super-resolution imaging of live cells", Nature Methods, 8(6):499-505 (2011).
Komyei, Z. et al., "Cell Sorting in a Petri Dish Controlled by Computer Vision", Scientific Reports, 3(1088):1-10 (2013).
Kozubek, M. et al., "An Efficient Algorithm for Measurement and Correction of Chromatic Aberrations in Fluorescence Microscopy." Journal of Microscopy, 200: 206-217 (2000).
Makise, Soshiro et al., "Serial Algorithm for High-speed Autofocusing of Cells using Depth From Diffraction (DFDi) Method", 2008 IEEE Int'l Conf. Robotics & Automation, Pasadena, CA, pp. 3124-3129 (May 19-23, 2008).
McLeod, E. et al., "Toward Giga-Pixel Nanoscopy on a Chip: A Computational Wide-Field Look at the Nano-Scale Nithout the Use of Lenses", Lab Chip, The Royal Society of Chemistry 13:2028-2035 (2013).
Mundanyali, O. et al., "Wide-Field Optical Detection of Nanoparticles Using On-Chip Microscopy and Self-Assembled Nanolenses", Nature Photonics, 7:247-254 (2013).
Ress, D., et al., "Automatic acquisition of fiducial markers and alignment of images in tilt series for electron tomography", J. of Electron Microscopy, 48(3):277-287 (1999).
Sabass, B., et al., "High Resolution Traction Force Microscopy Based on Experimental and Computational Advances", Biophysical Journal, 94:207-220 (2008).
Shapiro, H.M. Cellular Astronomy—Foreseeable Future in Cytometry, 60A Cytometry Part A, 115-124 (2004).
Vollath, D., et al., "The influence of the scene parameters and of noise on the behavior of automatic focusing algorithms", J. Microsc. 151:133-146 (1988).
Wang, Z., et al., "Optical virtual imaging at 50nm lateral resolution with a white-light nanoscope", Nature Communications, 2:218, 6 pages (2011).
Yamamura, S. et al., "Single-Cell Microarray for Analyzing Cellular Response", Anal. Chem., 77(24):8050-8056 (2005).
Yoshimoto, N. et al., "An Automated System for High-Throughput Single Cell-Based Breeding", Scientific Reports, 3(1191):1-9 (2013).
Zhao, Y. et al., "Optofluidic Imaging: Now and Beyond", Lab Chip, The Royal Society of Chemistry, 13:17-24 (2013).
Zhu, H. et al., "Optical Imaging Techniques for Point-of-Care Diagnostics", Lab Chip, The Royal Society of Chemistry 13:51-67 (2013).

\* cited by examiner

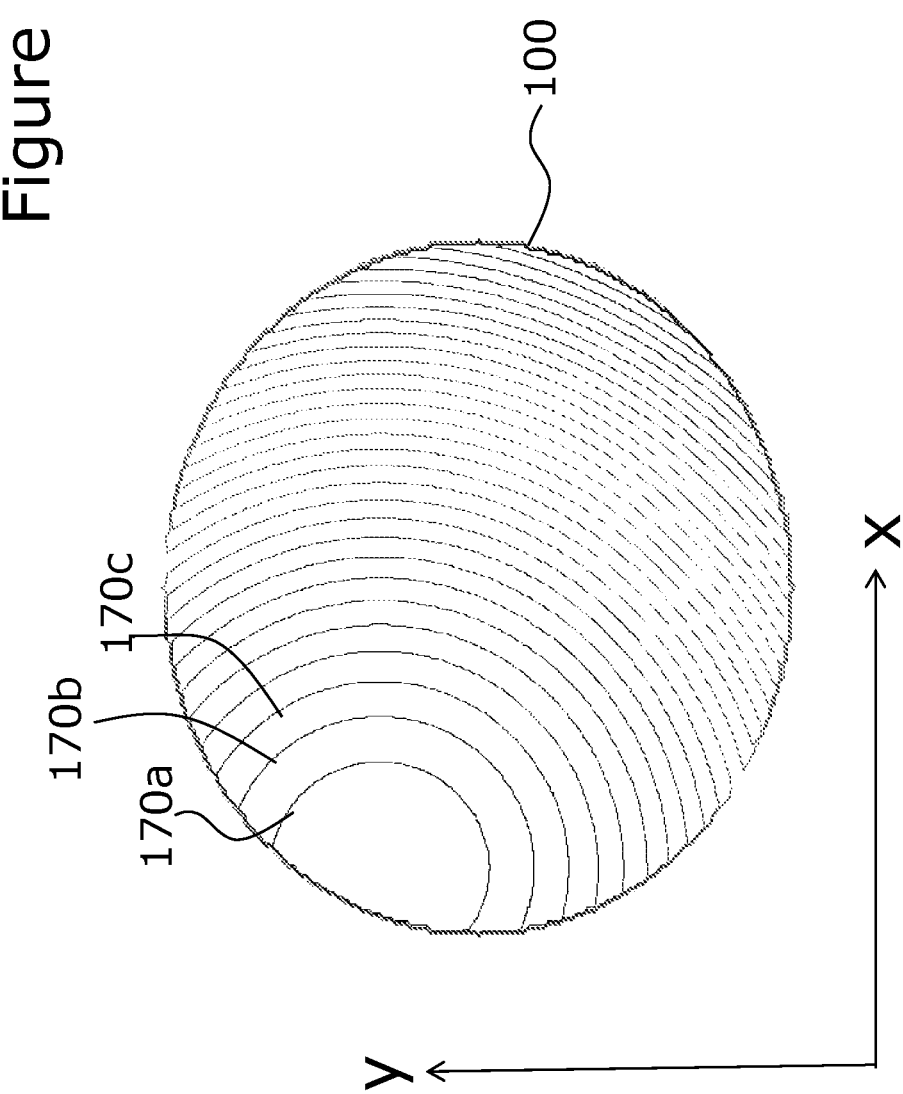

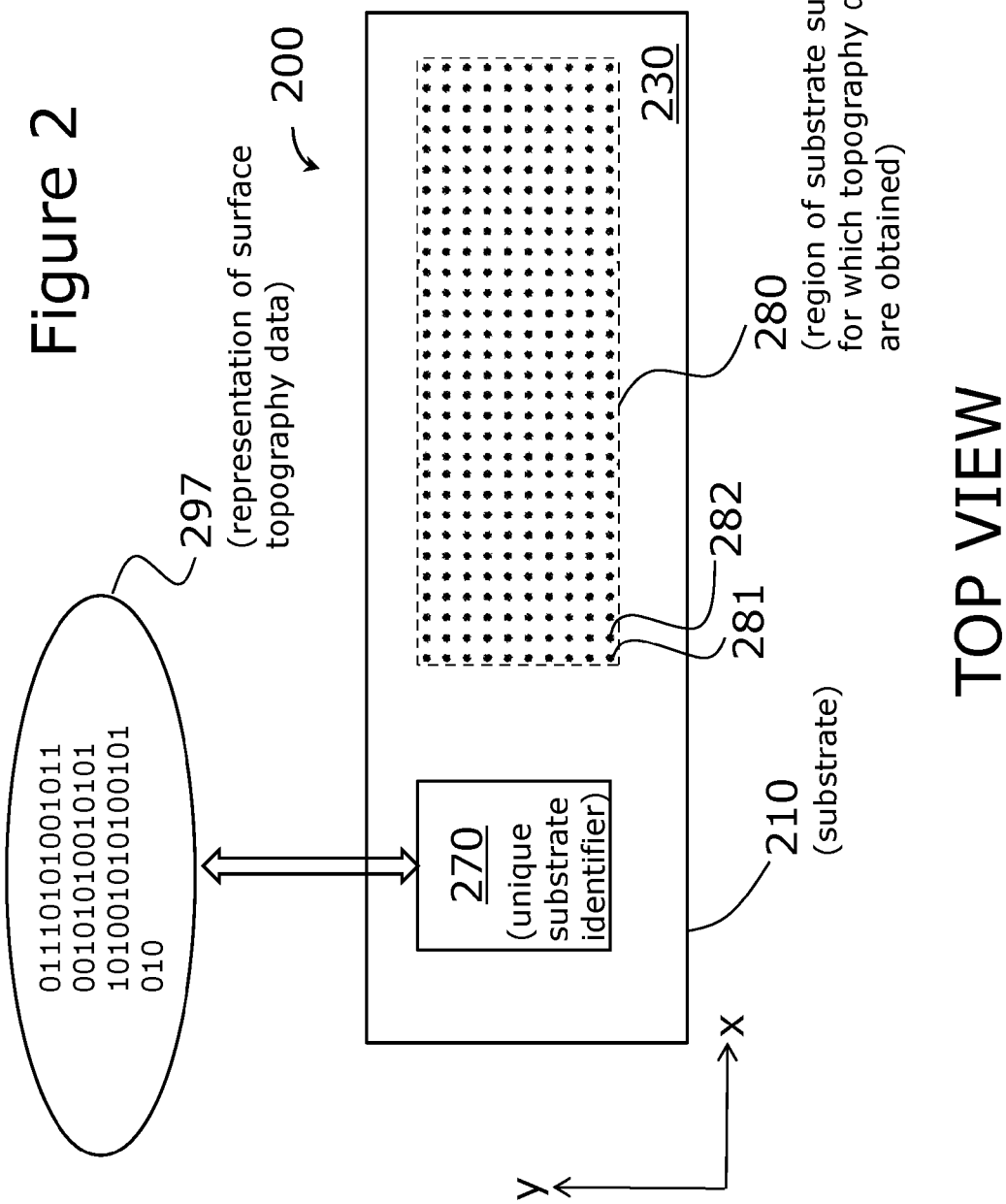

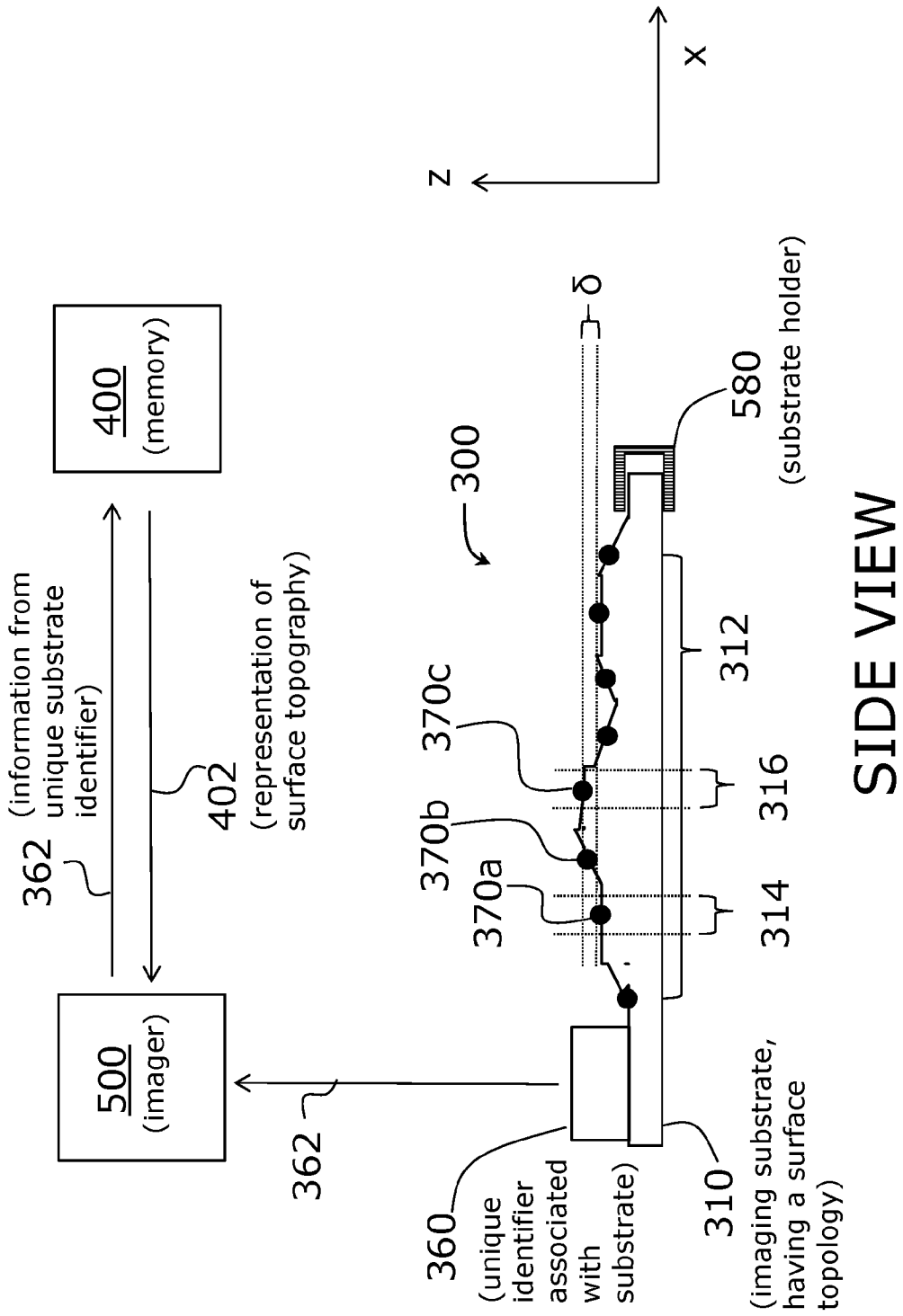

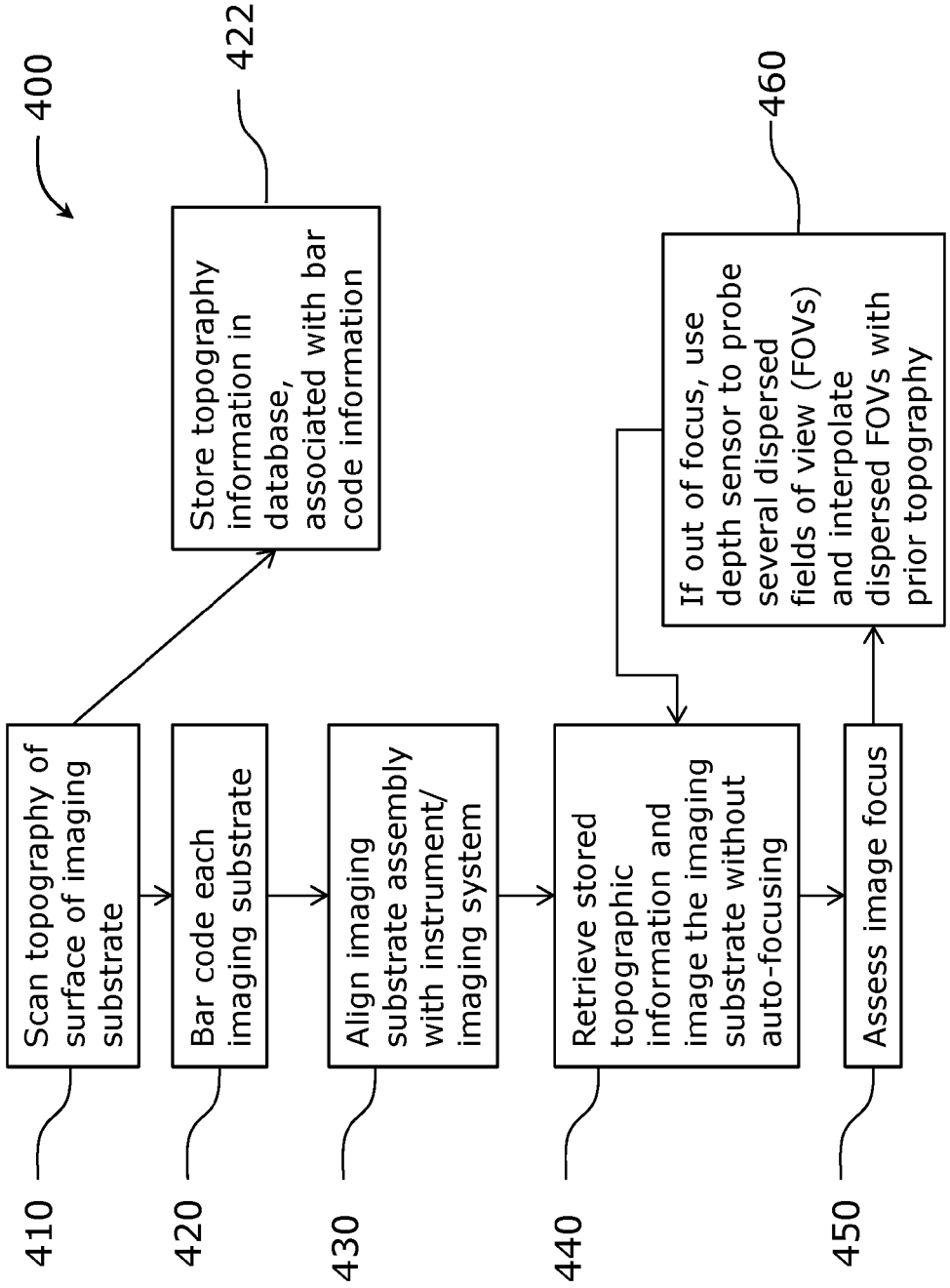

SUBSTRATE PRE-SCANNING FOR HIGH THROUGHPUT MICROSCOPY

RELATED APPLICATION

This application claims the benefit of U.S. Provisional Application No. 62/157,457, filed on May 5, 2015. The entire teachings of the above application are incorporated herein by reference.

BACKGROUND OF THE INVENTION

In microscopy, proper focus on a sample is essential for image quality. Many image quality problems in pathology slide scanners, for example, are related to improper focusing on the sample. There is a need for improved systems, methods, and imaging accessories that can help to facilitate focusing on samples.

SUMMARY OF THE INVENTION

Improved systems, methods, and imaging accessories facilitate focusing on samples, and can be used, for example, in high throughput applications where focus-related time delays can be particularly significant. Focus related time delays can be significant, for example, when a study requires imaging multiple fields of view, such that refocusing is required between images. Focus-related time-delays can limit the speed and efficiency of high throughput imaging methods. Automating focusing ("auto-focusing") technology, present in many automated pathology slide scanners and automated microscopes, has provided improvements over conventional focusing, but can still introduce time-delays, which can be particularly significant for high throughput work.

An embodiment of the present invention relates to a recognition that non-uniformities in substrate thickness and surface topography contribute significantly to the need for auto-focusing on a sample deposited thereon, and that these auto-focusing needs can be reduced or eliminated by measuring and storing substrate topography for later retrieval by an imaging system that can use the topographic information to help set appropriate focal parameters.

More specifically, imaging substrates, such as microscopy slides and Petri dishes, can vary in thickness, both from one substrate to the next, and from one region to the next on a given substrate. These variations alter the distance between the sample and the objective lens, and can require re-focusing when changing substrates and when imaging different regions of the same substrate. Measuring and storing substrate-specific topographical information for later recall can facilitate focusing by allowing a microscopy system to compensate for the topographical variations (e.g., by a corresponding change in a focal parameter), thereby reducing, or even eliminating, the need for traditional autofocus methods.

Accordingly, in one aspect, the invention relates to first pre-scanning and storing the topography for each substrate; and second, during imaging, recalling the substrate unique topography for use in setting the z-height of the optical detector. This principle can, of course, be extended to non-optical detection systems. Thus, during the imaging process, the imaging instrument already knows the optimal focal point for each field of view.

In one embodiment, the invention relates to an imaging substrate, the imaging substrate having a surface and the surface having a topography; and a unique identifier associated with the imaging substrate; wherein the unique identifier is further associated with a representation of the topography of the surface. In some embodiments: (a) the representation of the topography of the surface of the substrate is stored in a database, optionally wherein the database contains a representation of the surface topography of at least two imaging substrates; (b) the database contains a representation of the unique identifier, optionally wherein the database contains a representation of the surface topography of at least two imaging substrates; (c) the surface is a substantially planar surface; (d) the unique identifier is any one or a combination of: a barcode, a QR code, and an RFID tag; (e) the unique identifier is disposed on the surface; and/or (f) the representation of the topography of the surface is a digital representation, optionally wherein the digital representation of the topography of the surface is stored in a remote memory, and further optionally wherein the digital representation stored in the remote memory is retrievable via a wide area network, such as the Internet, based on the unique identifier.

In another embodiment, the invention relates to an imaging substrate assembly, comprising an imaging substrate, the imaging substrate having a surface and the surface having a topography; and an encoding device attached to the imaging substrate, wherein the encoding device contains a representation of the topography of the surface. In some embodiments: (a) the encoding device is a digital memory device, optionally wherein the representation of the topography of the surface is a two dimensional matrix; (b) the encoding device is disposed on the surface, optionally wherein the representation of the topography of the surface is a two dimensional matrix (e.g., QR Code); and/or (c) the representation of the topography of the surface is a contour map.

In yet another embodiment, the invention relates to a method for manufacturing an imaging substrate assembly, comprising: associating a unique identifier with an imaging substrate, the imaging substrate having a surface, defining a surface topography; scanning a region of the surface of the imaging substrate to collect surface topography data; and further associating the unique identifier with a representation of the surface topography data.

In some embodiments: (a) the method further comprises storing the representation of the surface topography data in a database, optionally wherein the database contains a representation of the surface topography of at least two imaging substrates; (b) the method further comprises storing a representation of the unique identifier in the database, optionally wherein the database contains a representation of the surface topography of at least two imaging substrates; (c) the surface is a substantially planar surface; (d) the unique identifier is any one or a combination of a barcode, a QR code, and an RFID tag; (e) the unique identifier is disposed on the surface; and/or (f) the representation of the topography of the surface is a digital representation, and optionally the method further comprises storing the digital representation of the surface topography in a remote memory, and further optionally wherein the representation is retrievable via a wide area network, such as the Internet, based on the unique identifier.

In a further embodiment, the invention relates to a method for manufacturing an imaging substrate assembly, comprising scanning a region of a surface of an imaging substrate to collect surface topography data; and associating an encoding device with the imaging substrate, the encoding device containing a representation of the surface topography data. In some embodiments: (a) the encoding device is a digital memory device, optionally wherein the representation of the topography of the surface is a two dimensional matrix; (b) the encoding device is disposed on the surface, optionally wherein the representation of the topography of the surface is a two dimensional matrix (e.g., QR Code); and/or (c) the representation of the topography of the surface is a contour map.

In another embodiment, the invention relates to a method for adjusting a focal parameter of an imaging system, comprising retrieving a representation of a topography of a surface of an imaging substrate based on at least one of an encoding device and a unique identifier, the at least one of the encoding device and the unique identifier being associated with the imaging substrate; and being further associated with the representation of the topography of the surface; and adjusting the focal parameter of the imaging system based on the retrieved representation of the topography of the surface.

In yet another embodiment, the invention relates to an imaging system, comprising: an imager having an adjustable focal parameter; an imaging substrate, the imaging substrate having a surface and the surface having a topography; and at least one of (i) a unique identifier associated with the imaging substrate; wherein the unique identifier is further associated with a representation of the topography of the surface; and (ii) an encoding device attached to the imaging substrate, wherein the encoding device contains a representation of the topography of the surface. In some embodiments, the system further comprises a device configured to receive information from the one of the unique substrate identifier and the encoding device (e.g., an RFID reader or optical scanner).

In yet another embodiment, the invention relates to a sample support assembly, comprising: a means for supporting a sample, the means for supporting the sample having a surface having a topography; and a means for uniquely identifying the means for supporting the sample, associated with the means for supporting the sample and further associated with a representation of the topography of the surface.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 is a representation of a Petri dish, showing surface topography.

FIG. 2 is a top view representation of an imaging substrate assembly according to aspects of the present invention.

FIG. 3 is a side view representation of an imaging system according to aspects of the present invention.

FIG. 4 is a representation of a method of manufacturing an imaging substrate assembly and operating an imaging system according to aspects of the present invention.

DETAILED DESCRIPTION OF THE INVENTION

A description of example embodiments of the invention follows.

Focusing can be time-consuming. Focus-related time delays can be particularly significant when a study requires imaging multiple fields of view, such that refocusing is required between images. Focus-related time-delays can limit the speed and efficiency of high throughput imaging methods.

Automating focusing ("auto-focusing") technology, present in many automated pathology slide scanners and automated microscopes, has provided improvements over conventional, manual focusing methods but still suffers from significant limitations or drawbacks. For example, although a sample can be automatically imaged at varying distances from the objective lens until optimal focal parameters are determined, methods that require taking several images are time-consuming and can produce fluorescence photobleaching of the sample. As another example, although laser-range finders can aid focusing by estimating the distance between the objective lens and the sample, laser control-feedback systems can be expensive. Accordingly, there is a need for systems, methods, and imaging accessories that can help to facilitate focusing on samples.

Aspects of the present invention relate to the recognition that non-uniformities in substrate thickness and surface topography contribute significantly to the need for auto-focusing on a sample deposited thereon, and that these auto-focusing needs can be reduced or eliminated by measuring and storing substrate topography for later retrieval by an imaging system that can use the topographic information to help set appropriate focal parameters.

FIG. 1, for example, shows the surface topography of an imaging substrate 100 (a Petri dish). Contour lines 170a, 170b, and 170c, spaced at contour interval D (not shown), show that the surface is not of uniform height (along the z-axis, perpendicular to the plane of the paper). The surface topography can be measured by determining the height of the surface at various points in the x-y plane. A wide variety of imaging substrates can be used, including a wide variety of materials known in the art to accept samples for imaging. Examples of imaging substrates for optical microscopy applications include, without limitation, glass slides and Petri dishes. In some embodiments, the imaging substrate is made of a uniform material, e.g., glass or plastic; in some embodiments, the surface is modified with one or more reagents (e.g., by chemical modifications, attachment of an antibody, protein coating, etc.)

FIG. 2 shows an imaging substrate assembly 200 according to aspects of the present invention. Imaging substrate 210 has a surface 230 onto which is mounted a unique substrate identifier 270. The topography of region 280 of surface 230 (e.g., the surface on which samples for imaging are to be deposited, e.g., the polished, finished surface of a glass microscopy slide, oriented toward the optics of an imager) is determined via a series of measurements at the illustrated points in the x-y plane, e.g., points 281 and 282, and represented in digital form in topography representation 297. Unique substrate identifier 270 is disposed on and uniquely associated with substrate 210. Further, unique substrate identifier 270 is uniquely associated with topography representation 297.

A wide variety of unique substrate identifiers can be used, such as labels, markings, etchings, codes (e.g., bar codes, QR codes, matrix codes, pictures, contour maps), serial numbers, radiofrequency identification (RFID) tags, and other physically identifying characteristics of an imaging substrate. Unique substrate identifiers can be, without limitation, attached to the imaging substrate; or attached to or associated with packaging for the imaging substrate. Unique substrate identifiers can be visible to the eye or invisible, e.g., microscopic. In some embodiments, unique substrate identifiers or representations thereof (including, for example, a binary representation of a base ten number, a numerical representation of a bar code, and a numerical transformation) are associated with the substrate topographic data (e.g., associated in a one-to-one manner); and for example, can further be stored along with the topographic data in a database, such that the substrate topographic data can be uniquely identified and retrieved when the representation of the unique substrate identifier is inputted.

While, in this example, topography of the imaging substrate has been measured, it should be appreciated that it is within the scope of the invention to measure a wide variety of substrate deviations or nonuniformities along the plane of the substrate, including changes in optical density, physical density, radioopacity, electric conductance, magnetic susceptibility, refractive index, and so on. Where one or more properties of a region of the substrate are sufficiently aberrant to render that region unsuitable for use in imaging, exclusion masks can be applied and associated with that region, such that any subsequent sample imaging data from that region is discarded.

It should be appreciated that a wide variety of measurement techniques can be used to measure substrate nonuniformities. For example, scanning techniques can be used, e.g., laser scanning, laser range finder, projected light surface scanning, atomic force microscopy (AFM), ultrasound, and optical coherence tomography. Data can be collected at discrete intervals or continuously along the x-y axis (plane of the substrate). Discrete intervals can be uniform (evenly spaced along the x-axis, y-axis, or both), or nonuniform. In some embodiments, topography measurements are taken approximately every 100 uM, 1 mM, or 1 cm.

Topography representation 297 is depicted as being a digital representation but a wide variety of representations can be used. For example, the representation can be analog, handwritten, typewritten, or otherwise represented. The topography data can be raw data, e.g., ordered (x,y,z) triplets representing position in the plane of the substrate (x,y) and surface height relative to baseline (z). Or the topography data associated with identifier 270 can be processed data, e.g., data that have been smoothed. In some embodiments the raw data can be fitted to a suitable parametric equation and best-fit parameters can be stored in representation 297.

Topography representations can be stored in a variety of media, locally or remotely. Examples include storage on read-writable/reprogrammable devices, disk drives, flash storage devices, hard drives, and servers. In some embodiments, a topographic representation is stored in a database accessible via a wide area network, such as the Internet, and/or that allows retrieval of the representation based on input of the unique identifier (or representation thereof). In some embodiments, databases store topographic representations for a plurality of imaging substrates, each paired with a unique identifier.

Finally, it should be recognized that an encoding device can be used in place of unique substrate identifier 270. A wide variety of encoding devices can be used including, for example, digital devices (e.g., a memory chip); analog devices (e.g., an adhesive label, which can, for example, be written upon or stamped such as with a code); a region of the imaging substrate itself, for example a surface region, which can be, for example, be etched or marked, such as with a serial number, code, QR code, or bar code; or other device capable of encoding information. In some embodiments, the encoding device is a map or diagram of the surface topography, such as, for example, a contour map; a contour map could, for example, be etched on a glass slide in a miniature form (e.g., major dimension less than about 1 cm, less than about 0.5 cm, less than about 1 mm) or a microscopic form (e.g., major dimension less than about 1 mm, less than about 100 uM, less than about 10 uM, less than about 1 uM). In preferred embodiments, the encoding device is further encoded with information, further preferably topography representation 297. A wide variety of encoding methods can be used, including digitization, compressive and noncompressive methods, "lossy" and "non-lossy" methods, digital and analog methods, and encrypted and unencrypted methods. In some embodiments the data is encoded with little or no processing. For example, the encoding device can be a memory chip mounted on the imaging substrate onto which topography representation 297 is loaded.

In some embodiments, an imaging substrate assembly is an imaging substrate together with one or both of: (i) a unique substrate identifier; and (ii) an encoding device. It should be appreciated that imaging substrate assemblies can include, in some embodiments, an assembly constructed from multiple pieces of material, e.g., a bar code added to a glass microscope slide; in other embodiments, an imaging substrate assembly can be monolithic or formed of a single piece of material, e.g., a glass microscope slide that is etched with a serial number (unique substrate identifier) or etched with a contour map of surface topography (encoding device).

FIG. 3 shows components of a microscope imaging system according to aspects of the present invention. A wide variety of devices that acquire information regarding an imaging substrate can be used as imagers. Examples of imagers include microscopes (e.g., optical microscopes, fluorescence microscopes, electron microscopes). Imaging substrate assembly 300 includes imaging substrate 310 (glass slide, shown in cross section) and unique substrate identifier 360. Substrate holder 580 positions the imaging substrate with respect to other components of imager 500, e.g., with respect to the optics. The distance between the slide and the optics can be varied by moving the holder with respect to the optics.

Surface topography of imaging substrate 310 is mapped in a region of the substrate. FIG. 3 depicts the extent of the mapped region along the x-axis as region 312, where the y-axis is normal to the plane of the paper. Measurements are taken at regular intervals, e.g., at points 370a, 370b, and 370c within the mapped region (at the depicted cross-sectional plane in the y-axis). A representation of these topographic measurements is uniquely associated with unique substrate identifier 360 and stored in memory 400. Based on the unique substrate identifier, imager 500 can retrieve the associated topography representation 402 from memory 400. It should be appreciated that memory 400 can hold information (topographic data and/or substrate identifier data) related to a plurality of imaging substrates, e.g., at least 2, at least 5, at least 10, at least 100, at least 1,000, at least 10,000, or at least 100,000 substrates. In some embodiments, data for one or more imaging substrates can be downloaded from a remote memory into a local memory for an imaging device, for later use without the need for internet connectivity.

Memory 400 can include a wide variety of devices, including magnetic storage devices, hard disk drives, flash memory, random access memory, floppy disks, flash drives (thumb drives), and so on. Information contained in memory 400 (or in an ultimate repository for such information, in the event that information is relayed through memory 400) can be organized in a wide variety of ways, including in databases, tables, lookup tables, spreadsheets, and so on. In some embodiments, memory 400 is a digital device; in other embodiments, it can be analog.

Imager 500 can use the retrieved topography representation to reduce or eliminate the need to auto-focus. For example, FIG. 3 depicts that there is a difference δ in the height of the substrate surface as between region 314 (the height of which can be estimated from the measurement taken at point 370*a*) and region 316 (the height of which can be estimated from the measurement taken at point 370*c*). In place of requiring the auto-focuser to reestablish focus when moving between these regions, imager 500 (associated with a computer processor unit, not shown) can calculate the deviation in focal plane resulting from the topography shift and compensate for it by adjusting a focal parameter (e.g., adjusting the stage relative to the objective lens) by a precise amount calculated to keep the image in focus notwithstanding the change in topographic environment.

Imager 500 can acquire information 362 from the unique substrate identifier in a wide variety of ways. For example, if the substrate identifier is a bar code printed on a label on the slide, the imager can be equipped with an accessory scanner that scans the bar code. As another example, if the substrate identifier is an RFID device, then the imager can be equipped with a module that can read the RFID device. The imager then communicates the information 362 acquired from substrate identifier to memory 400. Memory 400 can contain a database or lookup table of representations of substrate identifiers, paired with topographic representations in digital form. Based on the inputted substrate identifier, a topographic representation 402 is returned to the imager for use in facilitating focusing.

The alignment of the retrieved topographic representation with the mounted imaging substrate can then be checked, and if necessary adjusted. For example, imager 500 can auto-focus on three points (or more) within the mapped region of the imaging substrate, determining for each point an optimum focal parameter and then translate that optimum focal parameter into a distance between the objective lenses and the surface of the imaging substrate. The imager can then map these data onto the retrieved topographic representation, and if necessary refine the position. Such alignment checks can be used to detect and compensate for other sources of misalignment such as microscope stage tilt and deformation of imaging substrates (e.g., as mounted with clips). It should be appreciated that a wide variety of substrate holders 580 can be used. In some embodiments, the holder allows precise, reproducible positioning of imaging substrates in the x-y plane, i.e., facile alignment of the imaging substrate with respect to the imager optics. In some embodiments, an alignment (e.g., an initial alignment, periodic alignment, or post-imaging alignment check) can be performed based on fiducial markers (e.g., markers embedded in or added to the substrate and/or using edge detection, e.g., for one, two, three, or four sides of an imaging substrate.

In some embodiments, imager 500 assesses the degree of focus for acquired images using any of the focus-checking algorithms known in the art. As imager 500 acquires images in different imaging substrate regions, it adjusts for topography in those regions using retrieved topographic data. Where, however, it detects lack of focus notwithstanding these adjustments, it can perform additional autofocusing.

In some embodiments, if there is distortion of the imaging substrate from the pre-scanned topography, a distance sensor can be used to measure the distance between the optics and the substrate, thereby verifying whether the current topography matches the pre-scanned topography. If it does not, via interpolation of random locations throughout the substrate, an updated topography can be estimated given the prior pre-scanned topography.

FIG. 4 is a flow chart in accordance with aspects of the present invention. Process 400 starts by scanning imaging substrate topography in step 410. In step 420 a code (e.g., a bar code) is affixed to the imaging substrate and in step 422 topographic information is stored in a database, associated with the bar code information. In step 430, the imaging substrate assembly is aligned with the instrument. In step 440 images are taken without autofocusing, using the retrieved topographic information to set focal parameters. In step 450 the degree of image focus is assessed, and if determined to be out of focus, in step 460 a depth sensor is used to sample the actual slide topography at various points and compared to the topography retrieved from the database. (In the alternative standard focusing techniques can be used as a surrogate for depth sensing.) Differences between the on-the-fly sampled topography and detailed, stored topography can be used to detect and correct for misalignments, such as slide deformations, stage tilt, or substrate misalignment. Imager 500 can then update the detailed topography based on interpolative methods using the sampled topography, and imaging continues with auto-focusing at step 440.

Further, in some embodiments the invention relates to de-coupling focusing and imaging, either (1) in time, such that scanning the imaging substrate occurs, for example: before samples are loaded onto the substrate for imaging, before the substrate is loaded onto the microscope/imager or otherwise positioned for an imaging experiment, before any autofocusing, before any adjustment of focal parameters of a substrate positioned for imaging, before substrates are unpackaged, opened, cleaned, sterilized in preparation for sample loading, before substrates are packaged for sale or distribution, and/or before imaging; (2) in space, such that substrate scanning is performed using equipment separate and distinct from the equipment on which imaging is performed, e.g., performed using equipment in a facility, building, room, or city separate from a facility, building, room, or city that performs the imaging analysis on the sample-loaded substrate, e.g., at a dedicated substrate manufacturing facility or after-market scanning/tagging facility; or (3) in both time and space. In some embodiments, decoupling the substrate scanning in time, space, or both from image acquisition speeds the image acquisition step.

In some embodiments, the sample that is loaded for imaging onto an imaging substrate of the present invention is loaded as a monolayer, an approximate monolayer, and/or in a uniform manner. In other embodiments, substrate topography scanning is performed after sample is deposited onto the substrate. Where the sample is uniform and the sample focal plane is the same as or acceptably close to the focal plane of the surface of the imaging substrate, then topographic data regarding the surface of the imaging substrate can equal or approximate the topography of the sample surface after sample is added to the imaging substrate. Otherwise, an offset can optionally be used (representing the depth of the sample layer) in combination with the topography data of the imaging substrate to approximate the sample surface topography. The offset can be, for example, constant (e.g., if deposited sample is of uniform depth) or variable. The offset can be predetermined from direct measurement, or determined during imaging using, for example, autofocus on one or more regions of the substrate. Finally, for some applications, it can be desirable to image and record topographic data for imaging substrates that have been loaded with sample, such that the measured topography is that of the surface of the sample deposited on the substrate. Such topographic information for the surface of a deposited sample on a substrate can be used in like manner as described herein for topographic information regarding the surface of an imaging substrate.

In some embodiments, the manufacturer of disposable substrates (petri dishes, microscopy slides) pre-scans each substrate to measure and record its topology in a database. Before a particular substrate is imaged, its unique identifier code on the substrate is read to recall its topology from the database. In this way, only a small subset of all the fields of view need to be examined and the focusing time is reduced to the stage movement time.

In some embodiments, imaging substrate assemblies (as described herein) are used to facilitate focusing on samples that: (a) are biological specimens (e.g., thin slices of solid specimens prepared in the pathology laboratory, or blood smears, pap-smears, or cervical smears on microscopy slides); (b) require several fields of view to analyze (e.g., on the order of tens, hundreds, or thousands of fields of view, or more); or (c) both. In some embodiments, the biological specimen is a cell. In further embodiments, a dense monolayer of cells is deposited on the imaging substrate assembly as described herein and imaged at low magnification, e.g., where a single cell occupies between about 1 and 9 pixels when imaged, or about 1× to about 10× magnification.

Applications of the system include fast focusing of large biological specimens. By large we mean that it is required to analyze several fields of view (in the order of tens or hundreds) to reach the conclusion of the test. Such specimens can range from thin slices of solid specimens prepared in the pathology laboratory to blood smears or cervical smears/pap-smears in microscopy slides. Another application of the imaging substrate assemblies is in planar cytometry.

While this invention has been particularly shown and described with references to example embodiments thereof, it will be understood by those skilled in the art that various changes in form and details may be made therein without departing from the scope of the invention encompassed by the appended claims.

What is claimed is:

1. A method for adjusting tunable optics of an imaging system, comprising:
    retrieving, at an imaging system, a representation determined by surface topography measurement equipment of a topography of a surface of an imaging substrate free from sample, the retrieving being based on a unique identifier associated with both the imaging substrate and the representation of the topography of the surface; and
    adjusting, at the imaging system, the tunable optics based on the retrieved representation of the topography of the surface;
    wherein the imaging system is separate and distinct from the surface topography measurement equipment.

2. The method of claim 1, wherein the representation of the topography of the surface of the imaging substrate is stored in a database.

3. The method of claim 2, wherein the database contains a representation of the unique identifier.

4. The method of claim 3, further wherein the database contains a representation of the surface topography of at least two imaging substrates.

5. The method of claim 1, wherein the surface of the imaging substrate is a substantially planar surface.

6. The method of claim 1, wherein the unique identifier is any one or a combination of: a barcode, a QR code, and an RFID tag.

7. The method of claim 1, wherein the unique identifier is disposed on the surface of the imaging substrate.

8. The method of claim 1, wherein the representation of the topography of the surface of the imaging substrate is a digital representation.

9. The method of claim 8, further wherein the digital representation of the topography of the surface of the imaging substrate is stored in a memory remote from the imaging substrate.

10. The method of claim 9, further wherein the digital representation stored in the memory remote from the imaging substrate is retrievable via a wide area network based on the unique substrate identifier.

11. A method for adjusting tunable optics of an imaging system, comprising:
    retrieving, at an imaging system, a representation determined by surface topography measurement equipment of a topography of a surface of an imaging substrate free from sample, the retrieving being from an encoding device attached to the imaging substrate and containing the representation; and
    adjusting, at the imaging system, the tunable optics based on the retrieved representation of the topography of the surface;
    wherein the imaging system is separate and distinct from the surface topography measurement equipment.

12. The method of claim 11, wherein the encoding device is a digital memory device.

13. The method of claim 11, wherein the encoding device is disposed on the surface of the imaging substrate.

14. The method of claim 13, further wherein the representation of the topography of the surface of the imaging substrate is a two dimensional matrix.

15. The method of claim 13, further wherein the representation of the topography of the surface of the imaging substrate is a contour map.

16. The method of claim 14, wherein the two dimensional matrix is a QR Code.

* * * * *